United States Patent

[11] 3,598,150

| [72] | Inventor | John L. Nolan |
| | | Glenview, Ill. |
| [21] | Appl. No. | 833,450 |
| [22] | Filed | June 16, 1969 |
| [45] | Patented | Aug. 10, 1971 |
| [73] | Assignee | Hollister Incorporated |

[54] MEDICAL-SURGICAL VALVE ARRANGEMENT
7 Claims, 7 Drawing Figs.

[52] U.S. Cl. ............................................. 137/625.32,
251/352, 141/384
[51] Int. Cl. .......................................... F16k 5/04
[50] Field of Search .................................. 251/352,
350, 310, 345, 297; 137/625.31, 625.32; 141/384,
383, 346

[56] References Cited
UNITED STATES PATENTS

| 812,627 | 2/1906 | Wirth | 251/352 X |
| 2,682,357 | 6/1954 | Bogossian | 141/346 X |
| 2,925,990 | 2/1960 | Hempel | 251/352 X |

*Primary Examiner*—Arnold Rosenthal
*Attorney*—Hofgren, Wegner, Allen, Stellman and McCord ABSTRACT: A valve arrangement for a medical-surgical conduit means including first and second valve members, one of which has a female valve sleeve with ports therein and the other of which has a matingly received male valve sleeve with ports therein. Each of the valve members has mutually opposing faces with mutually engageable locking means on the faces for preventing relative rotation of the members and axial dislodgement thereof. The ports of the male member are arranged so that when the members are locked in and assembled condition the ports are either in communication or out of communication with the female ports depending upon the mode of intended use of the valve arrangement.

PATENTED AUG 10 1971　　　　　　　　　　　3,598,150
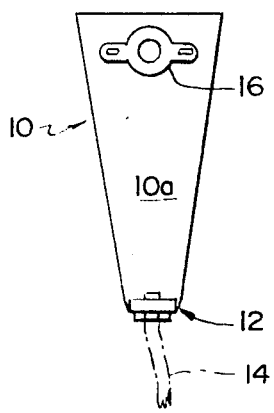
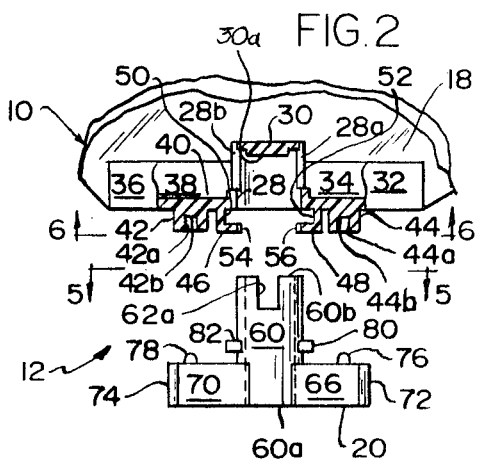
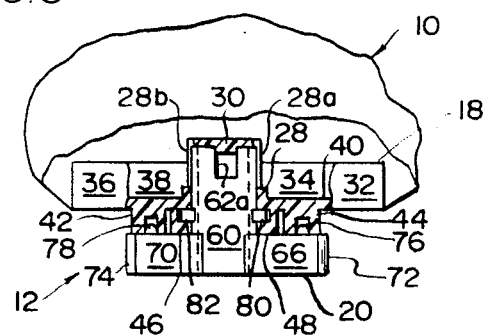
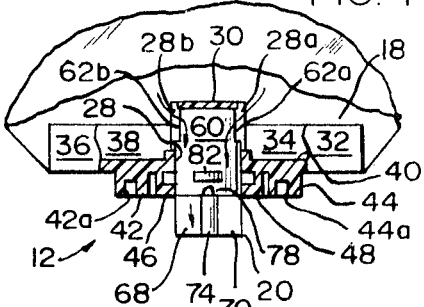
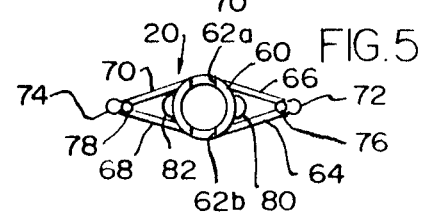
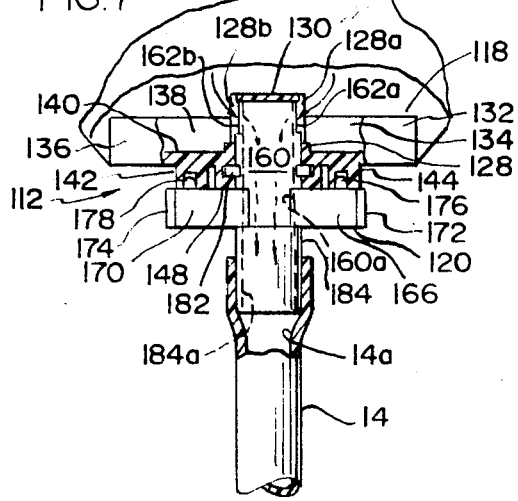
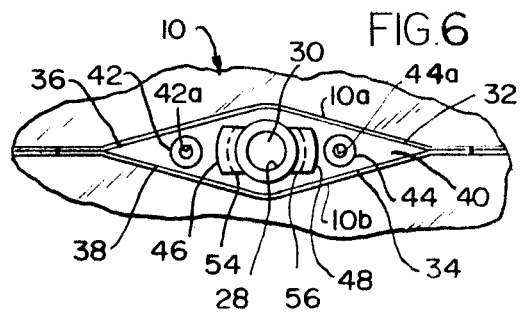
INVENTOR.
JOHN L. NOLAN
BY Hofgren, Wegner, Allen,
Stillman & McCord
ATTORNEYS.

MEDICAL-SURGICAL VALVE ARRANGEMENT

BACKGROUND OF THE INVENTION

1. Field of the Invention

This invention relates to medical-surgical appliances and more particularly a valve arrangement for use therewith.

2. Brief Description of the Prior Art

There are many forms of postsurgical drainage appliances for surgical reservoirs which are utilized in the medical art. Typically, a fluid line leads from the reservoir to a source of disposal or between the source of drain and the reservoir. In the case of the drainage appliances they may either be provided with an integral drainage line which is in continuous communication with a disposal means or may be closed so that the excretion and the like contained therein may be disposed of as a unit along with the appliance itself during periods of change of the appliance.

Further modifications of such drainage appliances includes the provision of a clamplike means for enclosing the normally open bottom thereof. Generally speaking, it is desirable to be able to selectively open or close a conduit means leading either from a postsurgical drainage appliance or which is in communication with a reservoir. It is further desirable to have such a means which is relatively inexpensive to manufacture and simple to assemble and operate and which preferably may be disposed so as to eliminate problems of sterilization thereof for reuse and the like. It is to the fulfillment of these desires that the present invention is directed.

SUMMARY OF THE INVENTION

This invention is directed, in brief, to the provision of an improved valve arrangement for use in the medical-surgical conduit line.

The best mode currently contemplated by me for carrying out the invention includes the provision of two valve members. The first member includes a generally hollow female sleeve with port means therein and a closure at the distal end of the sleeve which provides a stop means. The face of the sleeve is provided with projections which serve as part of a mutually engageable locking means. The second valve member includes a forwardly projecting male sleeve with ports therein. The second member is intended to matingly engage the first valve member in face to face juxtaposition with the male sleeve received within the female sleeve and bottoming against the stop means at the end of the female sleeve. The male valve member also has facial projections for engaging the facial projections of the female valve member following initial assembly of the male valve member and rotation thereof to bring the locking elements in locking engagement.

Also, it is preferable that both the male and female valve members have winglike lateral extensions which project laterally outwardly from either side of the sleeve. These extensions include upper and lower surfaces which converge together in a shallow-angle taper. With the male valve member, this provides an easily grasped surface for rotation and manipulation thereof. For the female valve member, this provides a relatively wide surface area for securement into a baglike drainage appliance by heat sealing between the plies of the bag.

It is further contemplated that one or both of the valve members can be provided with sleevelike extensions so that the valve members can be interposed intermediate a conduit line if desired.

BRIEF DESCRIPTION OF THE DRAWINGS

FIG. 1 is an elevational view of a postsurgical drainage appliance showing the valve arrangement of this invention in use therewith;

FIG. 2 is a fragmentary, enlarged, exploded view of the lower portion of FIG. 1 showing the components of the valve arrangement in a dissembled condition;

FIG. 3 is a view similar to FIG. 2 showing the components of the valve arrangement in an assembled condition with the components of the valve arrangement oriented to maintain the valve in a closed condition;

FIG. 4 is a view similar to FIG. 3 showing the components of the valve arrangement oriented to place the valve in an open condition;

FIG. 5 is a section view taken generally along the lines 5-5 of FIG. 2;

FIG. 6 is a section view taken generally along the lines 6-6 of FIG. 2; and

FIG. 7 is a view similar to FIG. 3 of a modified embodiment of the valve arrangement of this invention.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

Referring now to the drawings, in FIG. 1 there is shown a postsurgical drainage pouch 10 with which the valve structure or arrangement 12 of this invention may be utilized. The valve arrangement may be connected in conjunction with a drainage line 14 leading away from the drainage pouch. The usual rigid backing and attachment member 16 is shown as secured to one of the sides 10a of the bag which preferably is made from two sheets of plasticlike material forming a front 10a and a back 10b which are secured together around the peripheral edges except at the bottom where they are secured to the valve structure 12.

The valve arrangement 12 of this invention includes a two-part member including a male member 20 and a female member 18. Both the male and female members are preferably made of a rigid, slick plastic such as "Polyethylene" or the like. Both members are generally elongated diamond shaped in end elevation.

Female member 18 includes a body having a generally hollow, circular cylindrical sleeve or female valve passage 28 which terminates in a closed rear wall 30 having a centrally projecting stub 30a. Openings or port means 28a and 28b are provided in the sleeve 28 near the end 30. Two pairs of laterally extending and converging sidewalls 32, 34 and 36, 38 extend away from the central sleeve 28. A forward face 40 spans the area between the forward edges of the sidewalls 32, 34, 36 and 38. The sidewalls provide upper and lower surfaces of relatively large lateral extent and of substantial forward to rear width for facilitating securement of the member 18 in an appliance such as a drainage pouch 10. As mentioned, such pouches are usually made from sheet plastic material. Typically, member 18 is secured in a pouch 10 by heat sealing the plies of plastic material to the exterior surfaces of the member 18. It has been found that the elongated diamond structure (as viewed in elevation) of the acutely converging walls 32, 34 and 36, 38 gives an improved connection between the member 18 and pouch 10 by providing a relatively larger surface area for this securement.

A pair of generally cylindrical stubs 42 and 44 extend outwardly from forward face 40 on either side of the central sleeve 28. The stubs each have open ends 42a, 44a, respectively, and a rear wall 42b, 44b. As will be explained later, the stubs form part of a means for preventing unintended relative rotation of the male and female members of the valve arrangement or part of a means for maintaining the two members of the valve arrangement in a fixed position.

Fingerlike male gripping members also extend outwardly from forward face 40 on either side of central sleeve 20. Preferably, these members 46 and 48 include an outwardly extending portion 50 and 52 and mutually inwardly directed finger portions 54 and 56 which are spaced from the front face 40 and face inwardly toward each other in mutual opposition. The forward surface of finger portions 54 and 56 and of stubs 42 and 44 preferably are coplanar.

The male member 20 also includes a generally central hollow circular cylindrical sleeve or male valve element on passage 60 having open ends 60a and 60b and preferably being of a size and shape to be matingly telescopically received within the interior of the sleeve 28 of female member 18 and about stub 30a. In addition, the sleeve 60 has lateral openings or port means 62a and 62b adjacent the rear 60b.

The male member is further provided with laterally extending and converging pairs of sidewalls 64, 66 and 68, 70 which terminate in rounded ends 72 and 74 to provide a gripping surface as will be explained later. Rearwardly extending locking nodes 76 and 78 are provided adjacent the juncture of walls 64, 66 and 68, 70, respectively, and are positioned generally for registration with the stubs 42 and 44 to cooperate therewith to provide a means for preventing the unintended relative rotation of the components of the valve arrangement or for maintaining the components of the valve arrangement in a preselected functional mode. The edges of sidewalls 64, 66 and 68, 70 from which nodes 76 and 78 project generally define a planar forward face of male member 20.

Sleeve 60 is provided with opposed pairs of radially outwardly extending ribs 80 and 82 which extend outwardly from the sleeve spaced from the forward edge of walls 64, 66, 68 and 70. The spacing of ribs 80 and 82 from the forward edges of walls 64, 66, 68 and 70, is intended to be such as to permit the ribs to occupy the space behind the portions 54 and 56 of fingers 46 and 48 when the members 18 and 20 are brought into facial abutment, with nodes 76 and 78 occupying the recesses 42a and 44a and the forward faces of the locking fingers 46 and 48 abutting the forward face of the male member defined by the edges of the walls 64, 66, 68 and 70. This is best seen in FIG. 3. To assemble the two components, the sleeve 60 of male member 20 is inserted into the sleeve 28 of female member 18 with the sidewalls of the members 18 and 20 oriented transversely to each other so as to position the ribs 80 and 82 generally transverse to the fingers 46 and 48. The sleeve 60 of the male member preferably is of a length so as to abut the rear wall 30 of the sleeve 28 of the female member when the forward face of the male member is substantially coplanar with the forward edges of the elements 42, 44, 46 and 48 of the female member.

The male member is then rotated approximately 90° relative to the female member so that the ribs 80 and 82 will occupy the space behind the portions 54 and 56 of the fingers 46 and 48 and the locking nodes 76 and 78 will ride or cam over the ends of the stubs 42 and 44, and be nestably received in the openings 42a and 44a thereof. When so positioned, the openings 62a and 62b of sleeve 60 of the male member 20 are oriented approximately 90° out of phase with respect to the openings 28a and 28b of the sleeve member 28 of the female member 18. Thus, no fluid may pass through these sleeves and the valve is in a closed condition. The valve is prevented from unintentionally rotating to an open position by means of the frictional retention afforded by the seating of the nodes 76, 78 within the stubs 42 and 44. Moreover, unintentional reverse or axial withdrawal of the male member from the female member is prevented by reason of the occupation of ribs 80 and 82 behind the finger projections 54 and 56 of the locking fingers 46 and 48. Registration of the ribs 80 and 82 within the space afforded therefor is assured by the bottoming of the end of sleeve 60 against the rear wall 30 of sleeve 28 prior to rotation of the sleeve to the locked position as shown in FIG. 3.

When it is desired for the bag 10 to be drained, such as at times when a patient may be brought to suitable drainage facilities, the valve may be opened merely by rotating the male member approximately 90° relative to the female member so as to bring the openings 62a, 62b in registration with the openings 28a and 28b permitting fluid flow therethrough and through the hollow interior 60a of sleeve 60. The turning of the male member relative to the female member is assisted by providing the enlarged round ends 72 and 74 at the juncture of walls 64 and 66 and 68 and 70, respectively.

A modified arrangement of the present invention is shown in FIG. 7. Here the valve arrangement 112 is a normally open valve. The remaining elements are substantially the same as that shown with respect to the valve arrangement 12 and similar structural features have been identified by similar reference numerals in a "100" series. One significant difference is that the openings 162a and 162b of the male member 120 are arranged 90° out of phase with respect to those in the male member 20 so that when the male member 120 is assembled with the female member 118, the openings 162a and 162b of sleeve 160 are in alignment and registration with the openings 128a and 128b of the sleeve 128 so that the valve is normally open and must be rotated to move it to a closed position.

Another feature shown at FIG. 7 is that of the provision of a tubular extension 184 projecting outwardly from the rear face of the male member 120. Tubular extension 184 has a hollow interior 184a for communication with the hollow interior 160a of the sleeve of the male member. This permits the male member 120 to be positioned within the interior 14a of a drainage line 14 which may lead to an appropriate drainage receptacle in those cases where it is either inconvenient or impossible for the patient to be moved to a drainage receptacle for drainage of the bag 10.

The foregoing detailed description has been given for clearness of understanding only, and no unnecessary limitations should be understood therefrom, as some modifications may be obvious to those skilled in the art.

I claim:

1. A valve arrangement for use with medical-surgical irrigation apparatus comprising: a first valve member having a body, including a forward wall and a female valve passage opening through the forward wall, said female valve passage having means therein and defining fluid ports; a male valve member having a body including a wall and a male valve element extending from said wall and being of a size and shape to be movably received in said female valve passage, means in said male valve element defining fluid ports therein for alternately establishing communication with said female valve member, said male and female valve members being relatively movable between an open position wherein the female valve port means and the male valve port means are in communication; and a closed position wherein said port means are out of communication with each other; said male and female valve members being relatively separable in one of said open and closed positions; and locking means for securing the male and female members together in the other of said open and closed positions against movement from said position and against separation from each other, including recesses in one of the walls of one of the members and projections on the other of the walls of the other of the members, said recesses and projections being oriented relative to said male and female port means to lock the members together when the members are in one of the open and closed positions.

2. The valve arrangement of claim 1 wherein the female valve passage includes a stop means positioned relative to the forward wall of the valve member for limiting the insertion of the male valve member therein with the male valve member port means being located relative to the male forward wall to be in alignment with said female valve port means when the male and female valve members are assembled together with the male valve member abutting the female valve member stop means and the forward walls of said members are in a face to face abutment.

3. The valve arrangement of claim 2 wherein the male and female valve members are generally mating hollow sleeves.

4. The valve arrangement of claim 3 wherein the port means in said male and female valve members are slots formed in the sleeves.

5. The valve arrangement of claim 4 wherein the locking arrangement includes locking nodes projecting outwardly from the face of the male valve member and stubs projecting outwardly from the face of the female valve member having forwardly opening recesses therein of a size and shape to receive the locking nodes of the male valve member.

6. The valve arrangement of claim 4 wherein the locking means includes radially outwardly extending ribs on the sleeve of the male valve member spaced forwardly of the forward face thereof and mutually inwardly facing hooklike finger means projecting forwardly from the face of the female valve member being of a size and shape to generally nestably receive the ribs of the male valve member.

7. The valve arrangement of claim 6 wherein the male valve member sleeve includes a rearward extension for connection to a conduit line.